United States Patent
Takayama

(10) Patent No.: US 10,871,557 B2
(45) Date of Patent: Dec. 22, 2020

(54) VELOCITY DETECTION APPARATUS

(71) Applicant: DENSO CORPORATION, Kariya (JP)

(72) Inventor: Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 101 days.

(21) Appl. No.: 16/302,256

(22) PCT Filed: May 18, 2017

(86) PCT No.: PCT/JP2017/018666
§ 371 (c)(1),
(2) Date: Nov. 16, 2018

(87) PCT Pub. No.: WO2017/200041
PCT Pub. Date: Nov. 23, 2017

(65) Prior Publication Data
US 2019/0120953 A1   Apr. 25, 2019

(30) Foreign Application Priority Data

May 18, 2016   (JP) .................. 2016-099849

(51) Int. Cl.
*G01S 13/58*   (2006.01)
*G01S 13/10*   (2006.01)
*G01S 13/34*   (2006.01)
*G01S 13/93*   (2020.01)
(Continued)

(52) U.S. Cl.
CPC .............. *G01S 13/58* (2013.01); *G01S 13/10* (2013.01); *G01S 13/34* (2013.01); *G01S 13/93* (2013.01); *G01S 13/931* (2013.01); *G08G 1/16* (2013.01)

(58) Field of Classification Search
CPC .......... G01S 13/90; G01S 13/93; G01S 13/94; G01S 13/95; G01S 13/584; G01S 7/354; G01S 13/345; G01S 13/931; G01S 2007/358; G01S 13/28; G01S 7/23; G01S 7/2922; G01S 7/00; G01S 13/00; G01S 13/582; G01S 2007/356; G01S 13/34;
(Continued)

(56) References Cited

U.S. PATENT DOCUMENTS 7,053,813 B1 *   5/2006   Hubbert .................. G01S 7/024
342/26 R
7,605,744 B1 *   10/2009   Karhunen ............... G01S 13/22
342/26 R
(Continued)

OTHER PUBLICATIONS

A Dual-Pulse Repetition Frequency Scheme for Mitigating Velocity Ambiguities of the NOAA P-3 Airborne Doppler Radar.

*Primary Examiner* — Olumide Ajibade Akonai
(74) *Attorney, Agent, or Firm* — Maschoff Brennan

(57) ABSTRACT

A velocity detection apparatus includes a velocity detection section, a candidate detection section, a range setting section, and a selection section. The range setting section sets an observation range of the relative velocity with respect to a range which corresponds to the vehicle velocity detected by the velocity detection section and is less than twice a Nyquist velocity corresponding to a repetition period of the pulses. The selection section selects, as the relative velocity, a candidate which falls within the observation range set by the range setting section out of candidates for the relative velocity detected by the candidate detection section.

4 Claims, 7 Drawing Sheets

(51) Int. Cl.
*G01S 13/931* (2020.01)
*G08G 1/16* (2006.01)

(58) Field of Classification Search
CPC ...... G01S 13/581; G01S 13/282; G01S 13/92; G01S 13/227; G01S 15/584; G01S 13/32
USPC .......... 342/70, 71, 107, 109, 114, 115, 201; 701/301
See application file for complete search history.

(56) References Cited

U.S. PATENT DOCUMENTS

| | | | | |
|---|---|---|---|---|
| 2005/0122251 | A1* | 6/2005 | Shimomura | G01S 13/931 342/70 |
| 2008/0169966 | A1* | 7/2008 | Tsuchihashi | G01S 13/931 342/70 |
| 2014/0118184 | A1* | 5/2014 | Minowa | G01S 13/581 342/104 |
| 2014/0300743 | A1* | 10/2014 | Kumon | G06T 11/00 348/148 |
| 2015/0070207 | A1* | 3/2015 | Millar | G01S 13/4454 342/174 |

* cited by examiner

VELOCITY DETECTION APPARATUS

CROSS-REFERENCE TO RELATED APPLICATIONS

The present international application is a national stage application under 35 U.S.C. § 371(c) of PCT Application No. PCT/JP2017/018666, filed on May 18, 2017, which is based on and claims the benefit of priority from Japanese Patent Application No. 2016-099849 filed with the Japan Patent Office on May 18, 2016, the entire description of which is incorporated herein by reference.

TECHNICAL FIELD

The present disclosure relates to a velocity detection apparatus which detects a relative velocity of a target from a reception signal obtained by an in-vehicle Doppler radar.

BACKGROUND ART

A Doppler radar typically transmits a radar wave based on a transmission signal which is modulated into a pulse form having a certain width and is repeated with a certain period, and receives a reflected wave from a target which reflects the radar wave. For example, an FMCW Doppler radar is capable of detecting a relative velocity corresponding to a phase difference between two pulses by mixing a transmission signal with a reception signal to generate a mixed signal containing information about phases of pulses. When the phase difference exceeds ±180°, however, relative aliasing occurs, and this causes relative velocity ambiguities. A relative velocity corresponding to a phase difference of 180° is referred to as a Nyquist velocity.

As described in Non Patent Literature 1 below, a technique has been employed in which relative velocity ambiguities are mitigated by alternately transmitting the same pulse with two different periods to extend the Nyquist velocity.

CITATION LIST

Non Patent Literature

NPL 1: David P. Jorgensen, Tom R. Shepherd, and Alan S. Goldstein, 2000: A Dual-Pulse Repetition Frequency Scheme for Mitigating Velocity Ambiguities of the NOAA P-3 Airborne Doppler Radar. J. Atmos. Oceanic Technol., 17, 585-594.

SUMMARY OF THE INVENTION

When two types of repetition periods are used, pulses need to be separately processed for each of the repetition periods. Thus, as a result of detailed examination, the inventor has found a problem in which, as compared with the case where a single type of repetition period is used, the use of the two types of repetition periods causes a reduction in the number of reflected pulses with respect to which coherent integration can be performed, and this decreases the degree of improvement in an S/N ratio due to the coherent integration.

An aspect of the present disclosure preferably provides a velocity detection apparatus capable of unambiguously detecting a relative velocity of a target by using one kind of pulse repetition cycle.

An aspect of the present disclosure is a velocity detection apparatus which detects a relative velocity of a target with respect to a vehicle, which is equipped with an in-vehicle radar, from a reception signal received by the in-vehicle radar, the in-vehicle radar transmitting a radar wave based on a transmission signal which is modulated into a pulse form having a certain width and is repeated with a certain period and receiving a reflected wave from the target which has reflected the radar wave, the velocity detection apparatus including a velocity detection section, a candidate detection section, a range setting section, and a selection section. The velocity detection section detects a vehicle velocity. The candidate detection section detects a candidate for the relative velocity corresponding to a phase difference between a plurality of pulses contained in the reception signal. The range setting section sets an observation range of the relative velocity to a range which corresponds to the vehicle velocity detected by the velocity detection section and is less than twice a Nyquist velocity corresponding to a repetition period of the pulses. The selection section selects, as the relative velocity, a candidate which falls within the observation range set by the range setting section out of candidates for the relative velocity detected by the candidate detection section.

In general, a vehicle velocity determines a target with a relative velocity which needs to be paid attention to. Thus, limiting an observation range of the relative velocity according to the vehicle velocity causes no problem in observation of the target that needs to be paid attention. By limiting the observation range of the relative velocity, the observation range can be set to a range less than twice the Nyquist velocity. This makes it possible to uniquely select a relative velocity which falls within the observation range out of detected candidates for the relative velocity. Specifically, a relative velocity of a target which is appropriate as an observation target can be unambiguously detected by using a single type of repetition frequency.

Reference signs in parentheses mentioned in the claims indicate a correspondence relationship with specific means mentioned in an embodiment described later as an aspect of the present disclosure and do not limit a technical scope of the present disclosure.

DESCRIPTION OF THE EMBODIMENTS

With reference to the drawings, a description will be given of an illustrative embodiment for implementing the present disclosure.

<Configuration>

Figure 1:
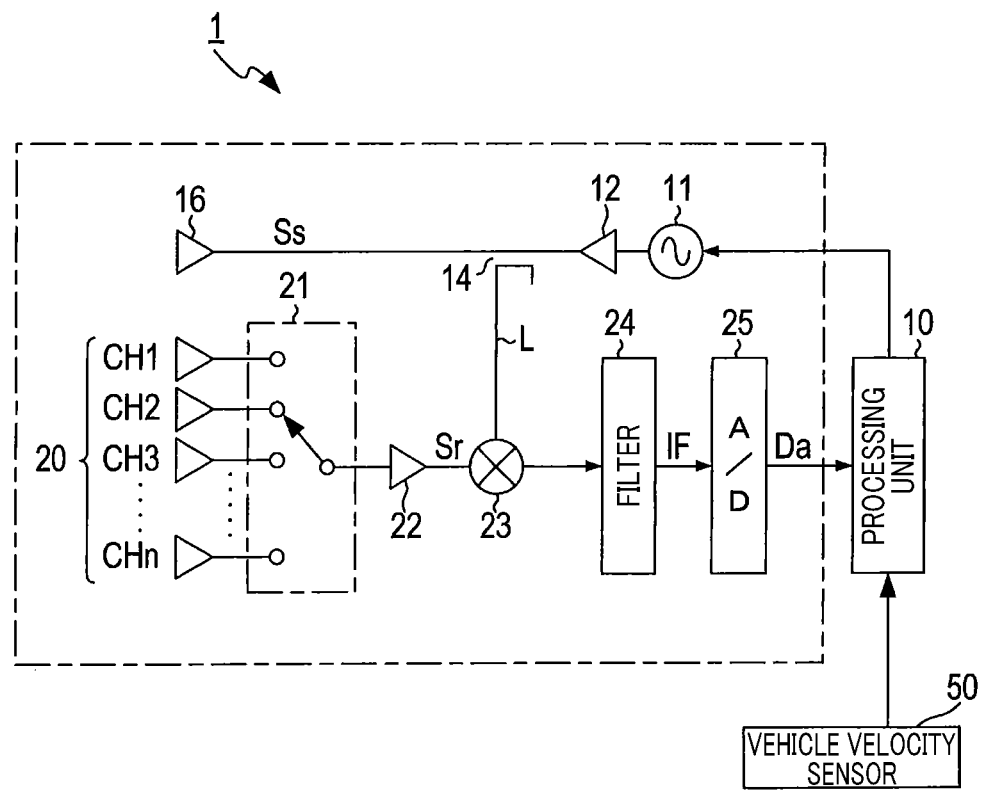
FIG. 1 is a block diagram illustrating a configuration of a radar apparatus.

First, with reference to FIG. 1, a configuration of a radar apparatus 1 will be described. The radar apparatus 1 is an in-vehicle millimeter wave radar which includes an oscillator 11, an amplifier 12, a distributor 14, a transmission antenna 16, a reception antenna section 20, a reception switch 21, an amplifier 22, a mixer 23, a filter 24, and an A/D converter 25.

Figure 2:
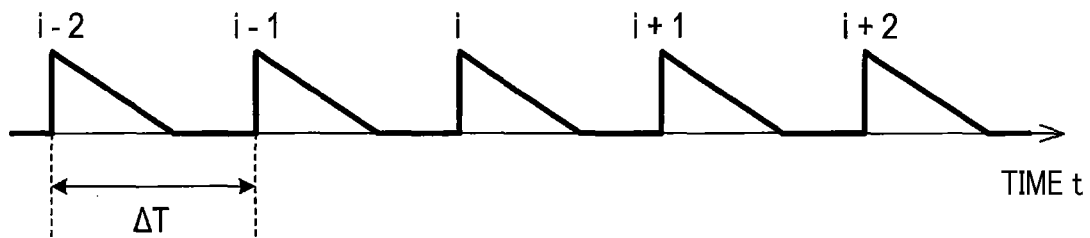
FIG. 2 shows a waveform of a transmission signal.

In response to a command from a processing unit 10, the oscillator 11 generates a modulation signal which is obtained by modulating a high frequency signal in a millimeter waveband having a frequency fc and a wavelength λc into a pulse form having a certain width and is repeated with a certain repetition period ΔT. Each pulse is a coherent pulse, and as shown in FIG. 2, a frequency of the high frequency signal forming each pulse is modulated so as to linearly decrease at a certain rate within a predetermined band. Accordingly, the difference in frequency between a transmission signal Ss and a reception signal Sr includes a variation in frequency due to a time period between transmission and reception corresponding to a distance to a target and a variation in frequency due to a Doppler shift. However, the width of each pulse is narrow so that a gradient of frequency decrease is sufficiently large, and the variation in frequency corresponding to the distance to the target is sufficiently large compared with the variation in frequency due to the Doppler shift. Thus, the variation in frequency due to the Doppler shift in a single pulse can be ignored. The amplifier 12 amplifies the modulation signal generated by the oscillator 11. The distributor 14 distributes output electric power of the amplifier 12 to a transmission signal Ss and a local signal L. The transmission antenna 16 radiates a radar wave corresponding to the transmission signal Ss.

The reception antenna section 20 includes n reception antennas, and a beam width of each of the reception antennas is set to include the entire beam width of the transmission antenna 16. The reception antennas are allocated to CH1 to CHn, respectively. Note that, n is a natural number. The reception switch 21 sequentially selects one of the n reception antennas included in the reception antenna section 20 and supplies a reception signal Sr from the selected reception antenna to a rear stage of the reception antenna. The amplifier 22 amplifies the reception signal Sr supplied from the reception switch 21.

The mixer 23 generates an intermediate frequency signal (hereinafter, IF signal) by mixing the reception signal Sr amplified by the amplifier 22 with the local signal L which is the same signal as the transmission signal Ss. At this point, as the IF signals, the mixer 23 generates a lower-frequency IF signal whose frequency is the difference in frequency between the reception signal Sr and the local signal L. The mixer 23 also generates a higher-frequency IF signal whose frequency is the sum of the frequency of the reception signal Sr and the frequency of the local signal L. The filter 24 is a low-pass filter. The filter 24 removes the higher-frequency IF signal out of the IF signals generated by the mixer 23 to output the lower-frequency IF signal. According to the present embodiment, the lower-frequency IF signal corresponds to a mixed signal. The A/D converter 25 samples the IF signal outputted from the filter 24 and converts the IF signal into digital data Da.

The processing unit 10 includes a microcomputer and an arithmetic processing unit, such as a DSP, for performing fast Fourier transform (hereinafter, FFT) processing and the like, with respect to the digital data Da. In the processing unit 10, a CPU executes a program stored in a non-transitory tangible storage medium, such as a ROM, so as to accomplish functions of a velocity detection section, a candidate detection section, a range setting section, and a selection section. Some or all of these functions may be implemented by using hardware in which a logic circuit, an analog circuit, and the like are combined. Furthermore, the processing unit may include a single microcomputer or a plurality of microcomputers. The processing unit 10 controls starting and stopping of the oscillator 11, and sampling performed by the A/D converter 25. The processing unit 10 detects an own vehicle velocity Vs from a measured value obtained by the vehicle velocity sensor 50 and detects a relative velocity Vr of a target from the digital data Da by using the detected own vehicle velocity Vs. Furthermore, the processing unit 10 detects target information such as a distance from the own vehicle to the target, and an azimuth of the target. According to the present embodiment, the processing unit 10 corresponds to a vehicle velocity detection unit.

<Aliasing of Relative Velocity>

A description will be given of aliasing of the relative velocity Vr. The following will describe calculation of the relative velocity Vr from pulses i−2 to i+2.

When a reflected wave reflected by a target located at a distance Re away from the radar unit 1 is received, a phase θ of the reception signal changes from a phase $θ_0$ of the transmission signal by $4πRe/λc$. Thus, the change in phase over time is represented by the following equation (1).

[Equation 1]

$$\frac{dθ}{dt} = \frac{4π}{λ_c} \frac{dR_e}{dt} \tag{1}$$

When fd indicates a Doppler frequency, dθ/dt is equal to a Doppler angular frequency, that is, 2πfd. Furthermore, dRe/dt is equal to a Doppler velocity, that is, a relative velocity Vd of the target. Thus, the equation (1) is represented by the following equation (2).

[Equation 2]

$$\frac{dθ}{dt} = 2πf_d = \frac{4π}{λ_d} V_d \tag{2}$$

Figure 3:
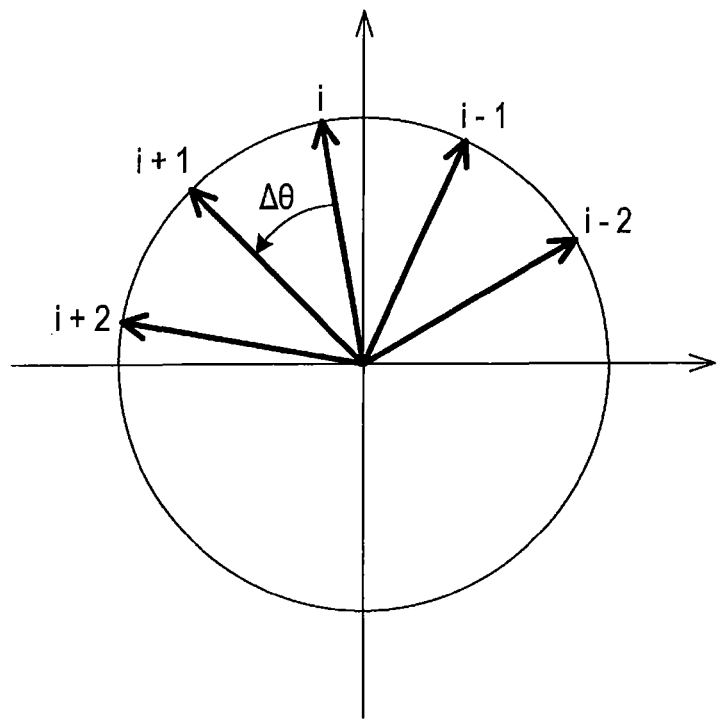
FIG. 3 shows a phase of each pulse of an IF signal.

As shown in FIG. 3, a phase of each pulse is rotated due to the Doppler effect. If the phase difference between successive pulses, that is, the phase difference during a time period ΔT is Δθ, Δθ=dθ/dt×ΔT. Thus, the relative velocity Vd is represented by the following equation (3).

[Equation 3]

$$f_d = \frac{Δθ}{2πΔT} = \frac{2V_d}{λ_d} \tag{3}$$

According to the sampling theorem, a measurable maximum frequency fdmax of the Doppler frequency fd is half of the frequency to be sampled, that is, half of the reciprocal of the period ΔT, which is a data interval, and thus, fdmax=½ΔT. The Doppler frequency fd reaches the maximum frequency fdmax when the phase difference Δθ is 180°. If the Doppler frequency fd exceeds the maximum frequency fdmax, that is, if the phase difference Δθ exceeds 180°, aliasing occurs in the relative velocity Vd. A Nyquist velocity Vn, which is the maximum velocity causing no aliasing, is represented as $Vn=\lambda d/4\Delta T$. The true relative velocity Vr is represented by the following equation (4). Note that m is an integer including a negative integer and, that is, so called a Nyquist number. Hereinafter, the measured relative velocity Vd is referred to as a measured value Vd, and the true relative velocity Vr is referred to as a relative velocity Vr.

[Equation. 4]

$$Vr=V_d+m\times 2V_n \quad (4)$$

Figure 4:
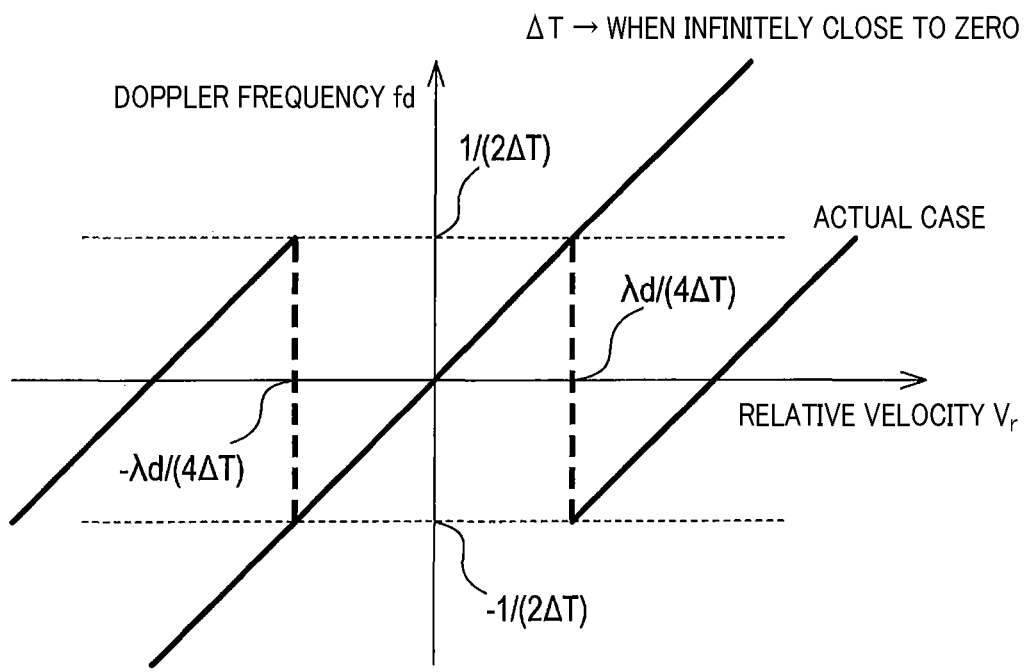
FIG. 4 is a diagram showing aliasing of a relative velocity.

As shown in FIG. 4, if the period $\Delta T$ is infinitely close to zero, no aliasing occurs, and the relative velocity Vr is always equal to the measured value Vd. However, in pulse radar such as the radar apparatus 1, the period $\Delta T$ has a certain width, for example, a width of several tens of microseconds, and thus actually, aliasing occurs when the relative velocity Vr is large. Accordingly, the measured value Vd needs to be corrected to the relative velocity Vr. In this case, if the Nyquist number is not uniquely determined, ambiguity occurs in the relative velocity Vr. Thus, an observation range Rg of the relative velocity Vr is set.

<Setting of Observation Range>

Figure 5:
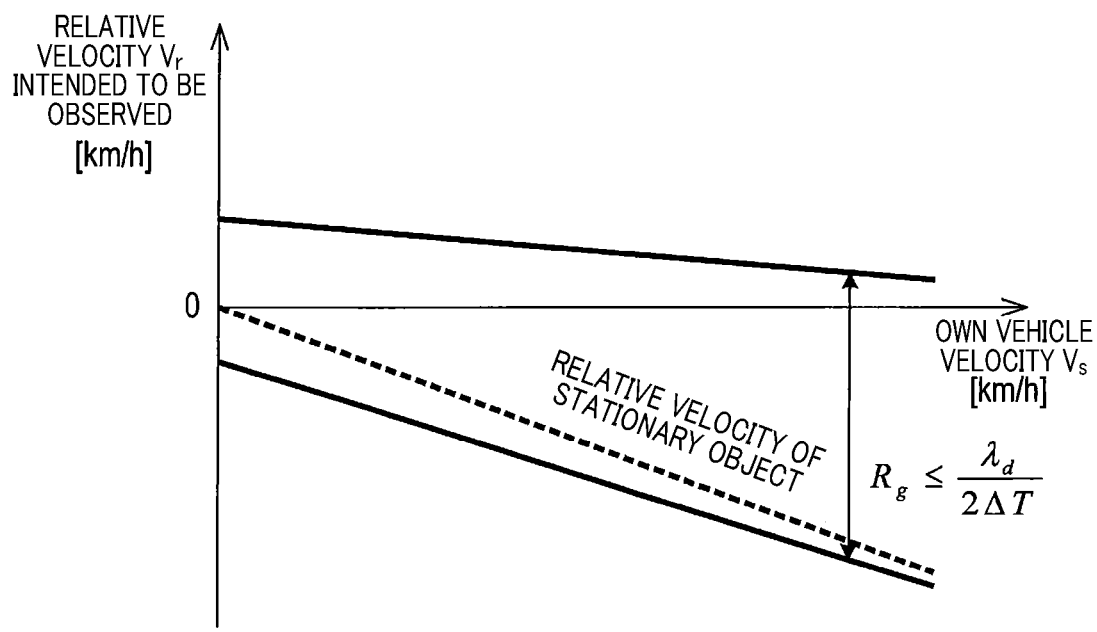
FIG. 5 is a diagram showing an observation range with respect to the own vehicle velocity.

Next, a description will be given of a method of setting the observation range Rg. FIG. 5 shows the set observation range Rg. In this case, the relative velocity Vr=a velocity of the target−the own vehicle velocity Vs is set, and the relative velocity Vr is positive when the direction of the velocity of the target is the same as that of the own vehicle velocity Vs and the velocity of the target is larger than the own vehicle velocity Vs.

Normally, the own vehicle velocity Vs determines a target with a relative velocity Vr which needs to be paid attention to. Thus, the observation range Rg is limited according to the own vehicle velocity Vs. Specifically, the observation range Rg is set so that the following conditions (1) to (3) are satisfied. Furthermore, in order to uniquely determine the Nyquist number, the observation range Rg is set to a range less than twice the Nyquist velocity Vn.

Condition (1): When the own vehicle velocity Vs is smaller than a preset velocity threshold, the observation range Rg is set to be narrower than a preset reference range. The velocity threshold is set to a value similar to that of a reduced speed of a vehicle, for example, 10 km/h. The reference range is the observation range Rg which is set to the reference own vehicle velocity Vs, for example, 50 km/h, in the range less than twice the Nyquist velocity Vn. The observation range Rg may be set to be narrower as the own vehicle velocity Vs is to be smaller.

Driving environment where the own vehicle velocity Vs is smaller than the velocity threshold is a parking lot, an intersection, and the like. Targets which are present around the own vehicle in such driving environment are pedestrians, vehicles traveling at a reduced speed, and the like, whose relative velocity Vr is small. Thus, when the own vehicle velocity Vs is smaller than the velocity threshold, setting the observation range Rg to be narrower than the reference range does not cause any problems. Erroneous detection due to noise is reduced by setting the observation range Rg to be narrower than the reference range.

Condition (2): An upper limit value of the observation range Rg is set to be smaller as the own vehicle velocity Vs is larger. As the own vehicle velocity Vs is larger, the relative velocity Vr of another vehicle is smaller which passes the own vehicle. For example, if the own vehicle is traveling at the own vehicle velocity Vs of 50 km/h, another vehicle may pass the own vehicle at a relative velocity Vr of 50 km/h. However, if the own vehicle is traveling at an own vehicle velocity Vs of 150 km/h, no other vehicle presumably passes the own vehicle at a relative velocity Vr of 50 km/h. If the own vehicle is traveling at the own vehicle velocity Vs of 150 km/h, observation of a relative velocity Vr up to approximately 20 km/h is sufficient. Thus, there may be no problem that an upper limit value of the observation range Rg is set to be smaller as the own vehicle velocity Vs is larger.

Condition (3): The observation range Rg is set so as to include the relative velocity Vr which is equal to a value obtained by adding a negative sign to a value of the own vehicle velocity Vs. A target whose relative velocity Vr is equal to a value obtained by adding a negative sign to a value of the own vehicle velocity Vs is a stationary object. In FIG. 5, the relative velocity Vr of the stationary object is indicated by the dashed line. In any driving environment, a stationary object is observed in many cases. Accordingly, if the relative velocity Vr of the stationary object is aliased and the stationary object is recognized as a moving object having a velocity, the stationary object may be erroneously tracked. Thus, the observation range Rg is set to the range in which the relative velocity Vr of the stationary object is not aliased so that the stationary object is not erroneously recognized as a moving object.

According to the present embodiment, a map of the observation range Rg for the own vehicle velocity Vs as shown in FIG. 5 is prepared in advance, and stored in a storage device such as a ROM. The map only needs to be prepared for the own vehicle velocity Vs up to the assumed maximum own vehicle velocity Vs, for example, 200 km/h.

<Detection of Relative Velocity>

Figure 6:
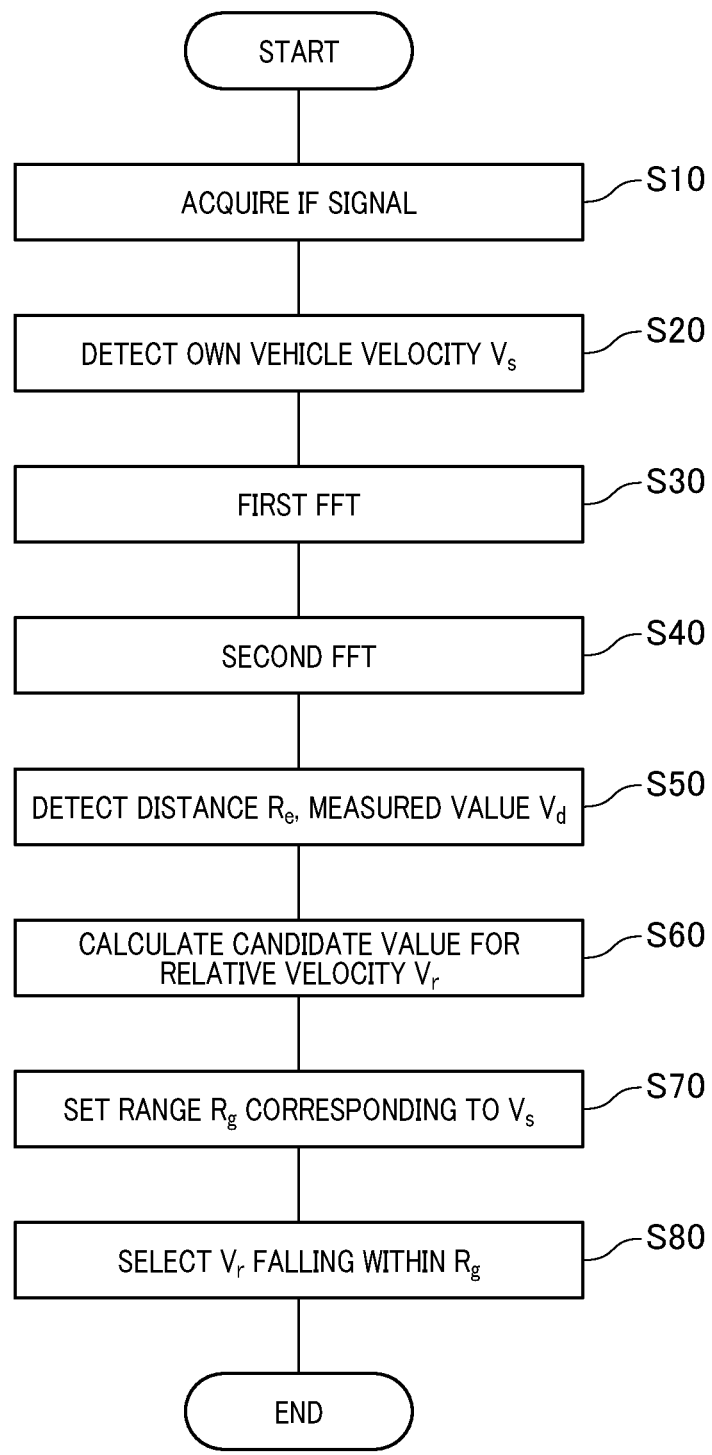
FIG. 6 is a flowchart showing a procedure of a process of detecting a relative velocity.

With reference to the flowchart in FIG. 6, a description will be given of a procedure for detecting the relative velocity Vr of the target. This process is performed by the processing apparatus 10 each time an IF signal is detected.

First, at step S10, digital data Da obtained by sampling an IF signal is acquired.

Subsequently, at step S20, the own vehicle velocity Vs is detected from a measured value obtained by the vehicle velocity sensor 50.

Figure 7:
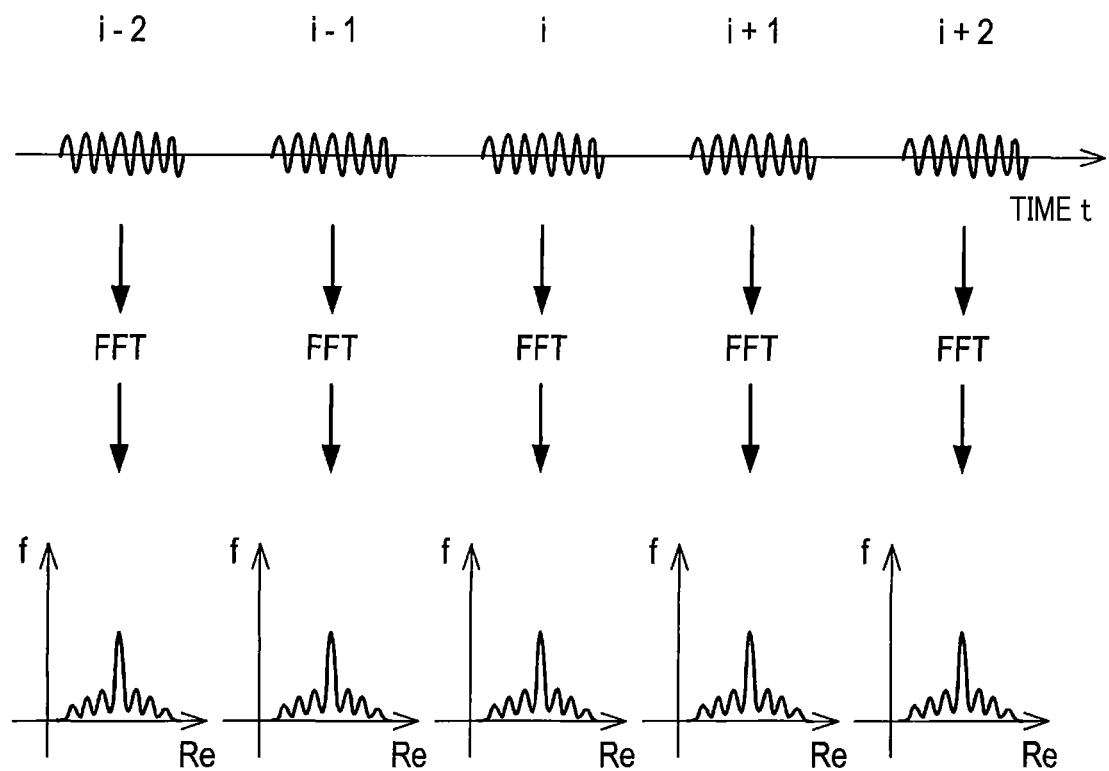
FIG. 7 schematically shows first FFT processing with respect to an IF signal.

Subsequently, at step S30, coherent integration is performed with respect to the digital data Da acquired at step S10. If a pulse number is Ni to which the coherent integration is performed, a coherent integration time Ti is $Ti=Ni\Delta T$. The coherent integration time Ti is a time during which the target is assumed not to be changed, and the coherent integration time Ti needs to be sufficiently smaller than a radar distance resolution $\Delta R=c/\Delta F$. For example, if $\Delta F$ is 300 MHz and the relative velocity Vr of the target is 50 m/s, the coherent integration time Ti is preferably smaller than 10 ms. Note that the speed of light is represented by c, and $\Delta F$ is an amount of change in transmission frequency during the coherent integration time Ti. First, as shown in FIG. 7, a frequency analysis, specifically, FFT processing, is performed for each pulse. Hereby, a frequency spectrum relative to the distance Re is calculated for each pulse.

Figure 8:
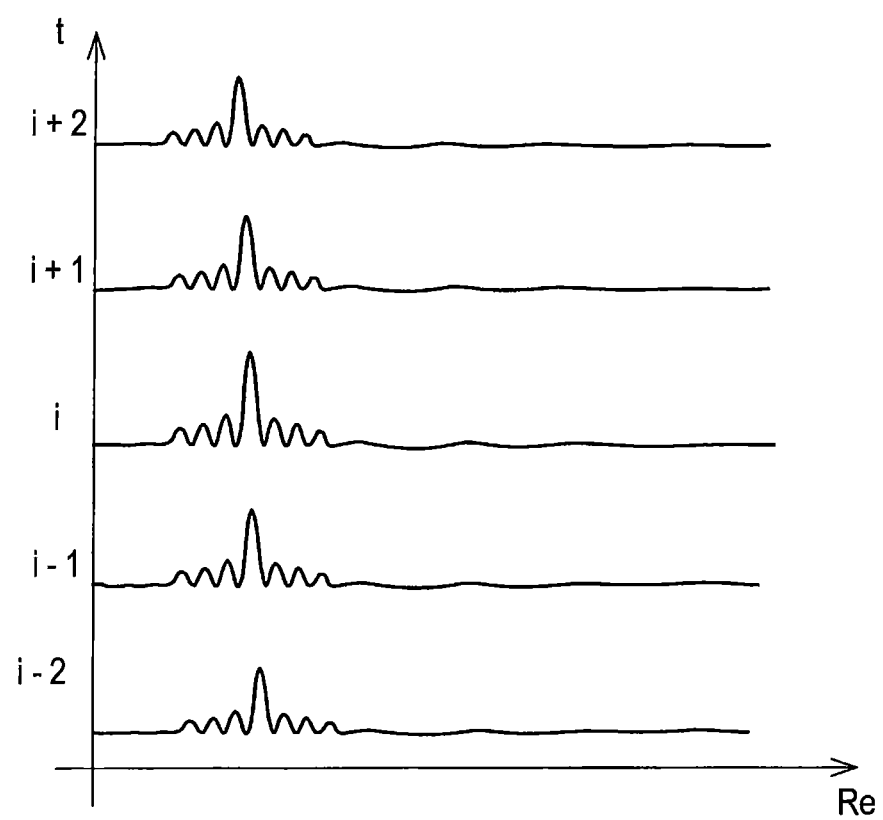
FIG. 8 schematically shows a chronological arrangement of spectra of respective pulses calculated in the first FFT processing.
Figure 9:
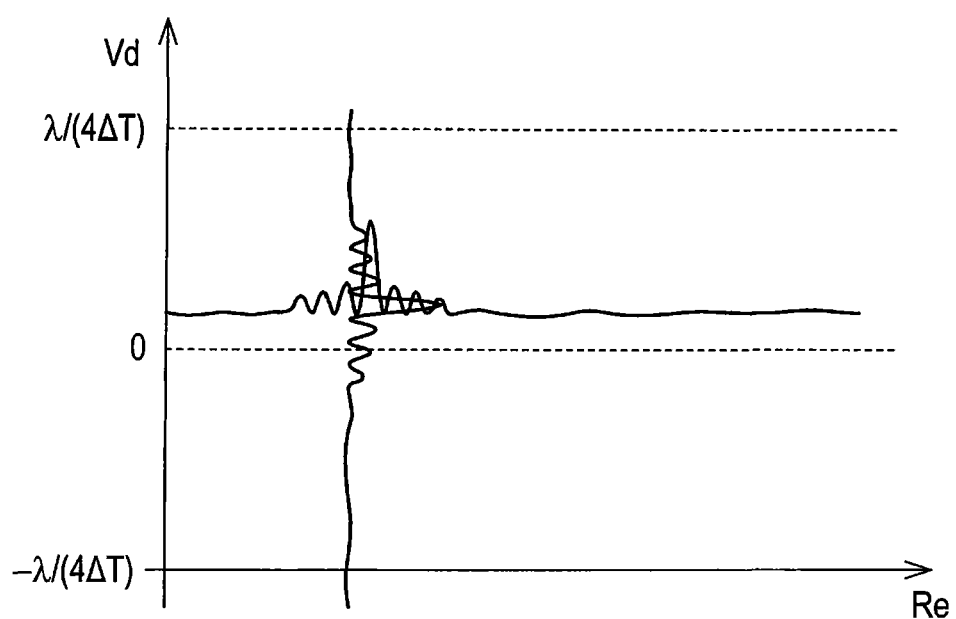
FIG. 9 schematically shows a result obtained when the spectra of the respective pulses calculated in the first FFT processing are chronologically arranged and second FFT processing is performed with respect to the spectra for each distance.

Subsequently, at step S40, as shown in FIG. 8, the frequency spectra calculated for the respective pulses at step S30 are chronologically arranged, and for each predetermined distance width, the FFT processing is performed with respect to the chronologically arranged frequency spectra. Hereby, as shown in FIG. 9, the frequency spectrum relative to the distance Re and the measured value Vd are obtained. FIG. 9 shows a two-dimensional plane for convenience, but actually, the data is three-dimensional.

Subsequently, at step S50, the distance Re and the measured value Vd are detected from the result of the FFT processing at step S40. The measured value Vd is detected as a value in the range of −Vn to Vn.

Subsequently, at step S60, a candidate value for the relative velocity Vr is calculated from the measured value Vd detected at step S50 and the equation (4). For example, a plurality of candidate values for the relative velocity Vr are calculated with the Nyquist number in the range of −5 to 5.

Subsequently, at step S70, by referring to the map of the observation range Rg for the own vehicle velocity Vs prepared in advance, the observation range Rg corresponding to the own vehicle velocity Vs is set, which is detected at step S20.

Subsequently, at step S80, out of the candidate values for the relative velocity Vr calculated at step S60, a candidate value which falls within the observation range Rg set at step S70 is selected as the relative velocity Vr. As mentioned above, since the observation range Rg is set to the range less than twice the Nyquist velocity Vn, the relative velocity Vr is uniquely selected out of the plurality of candidate values. Then, the present processing is terminated.

Azimuth estimation of the target has not been described, but azimuth of the target can be estimated by a well-known method such as MUSIC. According to the present embodiment, step S20 corresponds to a process performed by the function of the velocity detection section, and step S30 to step S60 correspond to processes performed by the function of the candidate detection section. Furthermore, step S70 corresponds to a process performed by the function of the range setting section, and step S80 corresponds to a process performed by the function of the selection section.

Effects

The present embodiment described above yields the following effects.

(1) By setting the observation range Rg to the range which corresponds to the own vehicle velocity Vs and is less than twice the Nyquist velocity Vn, the relative velocity Vr of a target appropriate as an observation target can be unambiguously detected by using a single type of period ΔT.

(2) If the own vehicle velocity Vs is small, erroneous detection due to noise can be reduced by narrowing the observation range Rg. Therefore, accuracy in detection of the relative velocity Vr can be improved.

(3) The upper limit value of the observation range Rg becomes smaller as the own vehicle velocity Vs is larger. Therefore, a target which is inappropriate as the observation target can be excluded from the observation range Rg, and thus the observation range Rg can efficiently be set. In particular, as the own vehicle velocity Vs is larger, the relative velocity Vr of the stationary object is larger, and thus a lower limit value of the observation range Rg needs to be smaller. By setting the upper limit value to be smaller, the lower limit value falls within the range in which the relative velocity Vr can be unambiguously determined.

(4) By setting the observation range Rg to include the relative velocity Vr which is equal to a value obtained by adding a negative sign to a value of the own vehicle velocity Vs, erroneous recognition of a stationary object as a moving object and tracking the stationary object can be prevented or reduced.

Other Embodiments

The embodiment for implementing the prevent disclosure has been described. However, the present disclosure is not limited to the embodiment mentioned above and can be variously modified.

(a) According to the above embodiment, the measured value Vd and the distance Re are detected by performing FFT processing in two stages with respect to the IF signal received by the FMCW radar. However, the present disclosure is not limited to this. Any radar capable of detecting a phase between pulses may be used.

(b) According to the above embodiment, the frequency of the high frequency signal forming each pulse of the transmission signal is modulated so as to linearly decrease. However, the frequency of the high frequency signal may be modulated so as to linearly increase. Alternatively, the frequency of the high frequency signal may be unmodulated.

(c) The observation range Rg does not need to be set to satisfy all of the conditions (1) to (3). The observation range Rg may be designed to satisfy only one or two of the conditions (1) to (3).

(d) Instead of storing the map of the observation range Rg for the own vehicle velocity Vs, a relational expression of the observation range Rg and the own vehicle velocity Vs may be stored. From the detected own vehicle velocity Vs and the relational expression, the observation range Rg corresponding to the own vehicle velocity Vs may be set.

(e) A plurality of functions of one component of the above embodiments may be implemented by a plurality of components, or one function of one component may be implemented by a plurality of components. Alternatively, a plurality of functions of a plurality of components may be implemented by one component, or one function implemented by a plurality of components may be implemented by one component. Furthermore, part of the configuration of the above-described embodiments may be omitted. Furthermore, at least part of a configuration of the above embodiment may be added to or replaced with another configuration of the above embodiment. The embodiment of the present disclosure should encompass all the modes included in the spirit specified only by the wording of the claims.

(f) Other than the above-described velocity detection apparatus, the present disclosure can also be accomplished in various forms, such as a system including the velocity detection apparatus as an element, a program for allowing a computer to function as the velocity detection apparatus, a non-transitional tangible storage medium, such as a semiconductor memory storing the program, and a velocity detection method.

The invention claimed is:

1. A velocity detection apparatus which detects a relative velocity of a target with respect to a vehicle, which is equipped with an in-vehicle radar, from a reception signal received by the in-vehicle radar, the in-vehicle radar transmitting a radar wave based on a transmission signal which is modulated into a pulse form having a certain width and is repeated with a certain period and receiving a reflected wave from the target which has reflected the radar wave, the velocity detection apparatus comprising:
 a velocity detection section configured to detect a vehicle velocity of the vehicle;
 a candidate detection section configured to detect a candidate for the relative velocity corresponding to a phase difference between a plurality of pulses contained in the reception signal;
 a range setting section configured to set an observation range of the relative velocity to a range which corresponds to the vehicle velocity detected by the velocity detection section, the observation range being set to a range less than twice a Nyquist velocity corresponding to a repetition period of the pulses; and a selection section configured to select, as the relative velocity, a candidate which falls within the observation range set by the range setting section out of candidates for the relative velocity detected by the candidate detection section.

2. The velocity detection apparatus according to claim 1, wherein the range setting section is configured to set the observation range so that the observation range is narrower than a preset reference range or the observation range is narrower as the vehicle velocity is smaller, when the vehicle velocity detected by the velocity detection section is smaller than a preset velocity threshold.

3. The velocity detection apparatus according to claim 1, wherein the range setting section is configured to set an upper limit value of the observation range to be smaller as the vehicle velocity detected by the velocity detection section is larger.

4. The velocity detection apparatus according to claim 1, wherein the range setting section is configured to set the observation range so that the observation range includes the relative velocity which is equal to a value obtained by adding a negative sign to the vehicle velocity.

* * * * *